Aug. 15, 1967   J. VERTUT   3,335,620
ARTICULATION DEVICES WITH TRANSMISSION OF MOVEMENTS
Filed April 23, 1964

United States Patent Office 3,335,620
Patented Aug. 15, 1967

3,335,620
ARTICULATION DEVICES WITH TRANSMISSION OF MOVEMENTS
Jean Vertut, Paris, France, assignor to Commissariat à l'Energie Atomique, Paris, France
Filed Apr. 23, 1964, Ser. No. 361,998
Claims priority, application France, May 10, 1963, 934,493
4 Claims. (Cl. 74—501)

The present invention relates to articulation devices which provide transmission of movements either by means of cables, belts or chains.

There exist many examples of such devices in which it proves a matter of difficulty to design supports for the aforesaid cables, belts or chains so that the length of these latter is maintained constant at the time of displacement of an articulation, and this problem has been partially solved by relating the movements of two articulations in such manner that, during their displacements, any variations in the length of said cables, belts or chains are mutually compensated.

The object of the invention is to make the above-mentioned devices such that they meet practical requirements more effectively than has hitherto been achieved, particularly insofar as they offer a precise solution to the problem outlined above by permitting the possibility of articulating two members while ensuring that the displacement of said articulation is in no way liable to produce any variation in length of the transmission or in the tension of the cables, belts or chains at the time of any angular displacement of one of the arms, these features being combined in a single compensating device in accordance with the present invention.

The invention mainly consists—while at the same time providing each of the two members to be articulated with at least one pulley which is integral therewith and the axle-pin of which carries the transmission of movements by cables, belts or chains—in associating said two pulleys in rotation in opposite directions by means of at least one compensating cable, belt or chain which is wound at least to a partial extent over said two pulleys and in the opposite direction with respect to said transmission cables, belts or chains and the ends of which are secured to said two pulleys, the distance between the axle-pins of said two pulleys being maintained constant by any suitable means.

Apart from this main arrangement, the invention further consists of certain other arrangements which are preferably employed at the same time and which are to be considered either separately or in any operative combinations thereof, namely:

Each of the two members to be articulated is integral with two pulleys to which are secured two compensating cables, belts or chains which are wound in opposite directions, The said pulleys are provided with helical grooves which permit said compensating cable, belt or chain to intersect without coming into rubbing contact The distance between said two axle-pins is maintained constant by means of a link-rod, the length of which can advantageously be adjusted so as to maintain the tension of said transmission and compensation cables, belts or chains.

The invention finally consists of a remote handling appliance which entails the application of at least one of the above-mentioned arrangements.

A clear understanding of the invention will in any case be gained from the complementary description which now follows and from the accompanying drawings, said complementary description being of course given solely by way of indication and not in any limitative sense.

Figure 1:
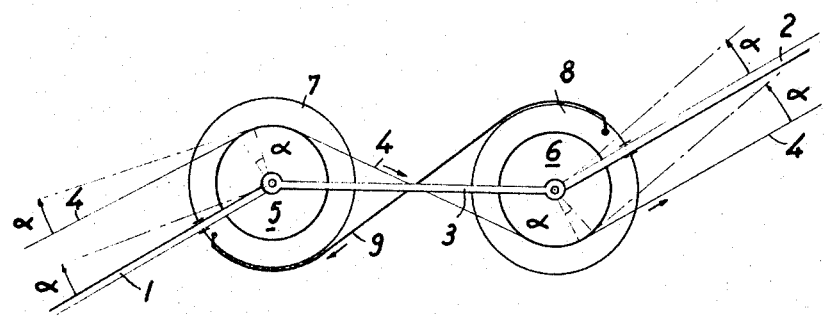
FIG. 1 is a diagram of an articulation with compensation device in accordance with the invention.

Reference being made to FIG. 1 there will now be described an articulation system of improved design according to the invention, between two arms 1 and 2 which are coupled by means of a link-rod 3. It will be assumed that a single transmission of movement is to be carried out by the cable 4 which passes successively and in the directions indicated in the figure over the two pulleys 5 and 6. The said pulleys are freely mounted respectively on the fulcrum pins of the arms 1 and 2 and of the link-rod 3. Two other pulleys 7 and 8 which are also mounted to rotate freely on the same fulcrum pins but which are integral respectively with the arms 1 and 2 are accordingly intended to constitute, in conjunction with the cable 9, the compensation device according to the invention.

The aforesaid cable 9 is secured to the two pulleys 7 and 8 and wound at least to a partial extent around these two pulleys in opposite directions from one pulley to the other and also in the direction opposite to that in which the transmission cable 4 passes over the pulleys 5 and 6, with the result that the transmission cable 4 and compensating cable 9 intersect between the two fulcrum pins.

It will be assumed that the link-rod 3 is stationary and that the arm 1 has an angular displacement α about its point of pivotal attachment to the link-rod 3. The transmission cable 4 which is constantly parallel to the arm 1 also rotates through an angle α about the same axis and the length of said cable which is wound over the pulley 7 decreases by the quantity Rα, R being the common radius of the pulleys 5 and 6. It can be seen that the pulley 7 which is integral with the arm 1 will also rotate through the angle α, this rotation being transmitted by the cable 9 to the pulley 8. The arm 2 which is integral with the pulley 8 will accordingly rotate through an angle α about its point of pivotal attachment to the link-rod 3, and the second portion of the transmission cable 4 which accompanies this movement of rotation will accordingly cause the length of said cable which is wound around the pulley 6 to increase by the quantity Rα. It can be seen that the two variations in the length of winding of the cable 3 over the pulleys 5 and 6 are mutually compensated. Similarly, the tension of the cable 5 and that of the cable 9 are oppositely acting on condition that these tensions cannot be reduced to zero. This last condition will be ensured by the link-rod 3, the length of which can usefully be adjusted in such manner as to maintain constant the tensions of the cables 4 and 9. It will be apparent that another compensating cable can be disposed symmetrically with the cable 9 relatively to the link-rod 3 and such a cable would be secured to pulleys which are similar to the pulleys 7 and 8.

Figure 2:
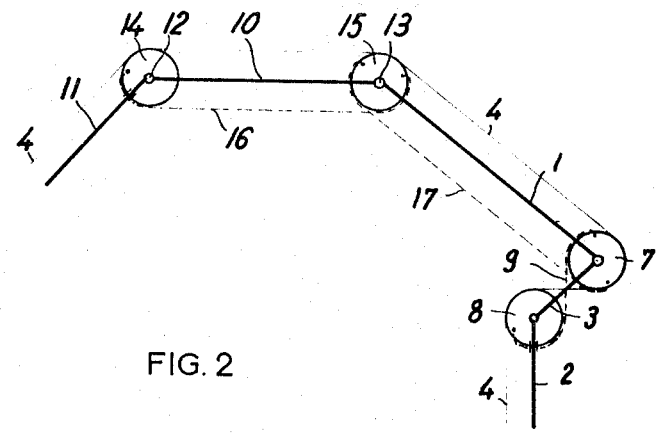
FIG. 2 is a diagram of the application of the compensation device in accordance with the invention to an articulated polygon.

Reference being made to FIG. 2, there will now be described the application of the compensating device according to FIG. 1 to an articulated polygon. It will be assumed in this figure that the arm 1 is preceded by two other arms 10 and 11 which are articulated respectively at 12 and 13. It has been assumed in this figure that the pulleys which carry the transmission cable 4 have the same diameter as the pulleys which carry the compensating cables, and therefore cannot be seen.

In order to construct a strictly accurate compensation system according to the invention, it will merely be necessary to mount at the point of articulation 12 a pulley 14 which is integral with the arm 11 and at the point of articulation 13 a pulley 15 which is mounted to rotate freely on the fulcrum pin of said articulation. A compensating cable 16 which is secured to the pulleys 14 and 15 is intended to transmit the rotation of the pulley 14 to the pulley 15. Similarly, a second compensating cable 17 which is secured to the pulleys 15 and 7 is in turn designed to transmit this movement of rotation to the pulley 7. It will therefore be apparent that, in order to compensate differences in length of take-up of the cable 4 along the entire polygon as shown, it is merely necessary to provide a single compensation system in accordance with that of FIG. 1 and consisting of the link-rod 3, the pulleys 7 and 8 and the cable 9, the difference being that in this case, the pulley 7 must no longer be integral with the arm 1 but must be mounted to rotate freely on the pin which serves to provide an articulation between the said arm and the link-rod 3.

Figure 3:
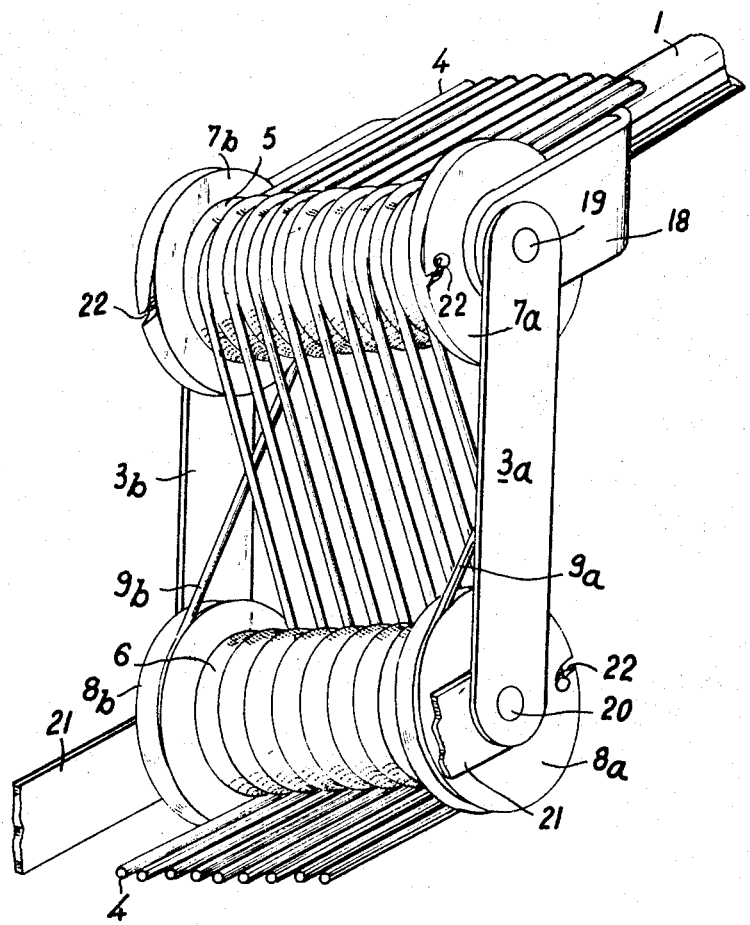
FIG. 3 is a view in isometric perspective of the system of articulation of a remote handling device as compensated in accordance with the invention.

Reference being made to FIG. 3, there will now be described the application of a compensation system in accordance with that of FIG. 1 to the articulation of a remote handling appliance. The arm 1 terminates on a yoke or U-link 18 fitted with a pivot-pin 19 on which nine pulleys, for example, such as the pulley 5 are mounted to rotate freely. The transmission cables such as the cable 4 are intended to pass over the aforesaid pulleys. In this case, the link-rod will consist of two members 3a and 3b which are pivotally mounted on the pin 20 together with the yoke 21 of the arm 2 which has not been shown in the figure. There are also mounted to rotate freely on the pin 20 nine pulleys such as the pulley 6 over which cables such as the cable 4 are intended to pass in the direction shown in the figure. Each of the pins 19 and 20 is designed to carry two pulleys 7a and 7b, 8a and 8b which are respectively integral with the yokes 18 and 21 and to which are attached at points such as 22 two compensating cables 9a and 9b.

It should be noted that the pulleys 7a, 7b, 8a and 8b could be provided with helical grooves enabling the cables 9a and 9b to intersect without coming into rubbing contact at the time of the relative movements of the shafts 1 and 2.

As will be readily understood, and as the foregoing description has furthermore made apparent, the invention is not limited in any sense either to the constructional examples or to the modes of application which have been more especially contemplated but is intended, on the contrary, to include within its scope any and all alternative forms.

In the accompanying claims the cables, belts or chains as referred to above are generically described as flexible, non-extensible elements.

What I claim is:

1. Articulation device for transmission of movements by flexible non-extensible transmission elements comprising two articulated members, a pulley integral with each of said members, an axle pin for each of said pulleys carrying the transmission of movement by said transmission elements, a flexible non-extensible compensating element connecting said pulley for one of said members for rotation in opposite direction to said pulley of the other of said members and wound at least partially over said pulleys and in opposite direction to that of said transmission elements, means for securing the ends of said compensating element to said pulleys and means for maintaining constant the distance between said axle pins.

2. A device as described in claim 1 including a second pulley integral with each of said members and a second flexible non-extensible compensating element connecting said second pulleys and extending in opposite direction to said compensating element.

3. A device as described in claim 1, said means for maintaining the distance between said axle pins comprising a link-rod adjustable to maintain the tension of said elements.

4. Articulation device for transmission of movements by flexible non-extensible transmission elements comprising a plurality of articulated members, the variations in length of said element being compensated by the device described in claim 1 disposed between two end members of said members.

References Cited
UNITED STATES PATENTS

| | | | |
|---|---|---|---|
| 628,685 | 7/1898 | Bessesford. | |
| 842,416 | 1/1907 | Nelson | 74—95 X |
| 2,476,249 | 7/1949 | Payne | 74—501 X |
| 2,869,139 | 1/1959 | Mosher. | |
| 2,903,896 | 9/1959 | Greene | 74—95 |
| 3,111,230 | 11/1963 | Pesenti | 214—1 |
| 3,146,973 | 9/1964 | Haase | 74—96 X |

FRED C. MATTERN, Jr., *Primary Examiner.*

C. F. GREEN, *Assistant Examiner.*